June 23, 1959 A. C. TODD 2,892,163

BAND-PASS FILTERS

Filed Oct. 5, 1956

INVENTOR.
ALVA C. TODD
BY George A. Guest
ATTORNEY

United States Patent Office 2,892,163

Patented June 23, 1959

2,892,163

BAND-PASS FILTERS

Alva C. Todd, Lafayette, Ind., assignor to International Telephone and Telegraph Corporation Application October 5, 1956, Serial No. 614,104

2 Claims. (Cl. 333—73)

This invention relates to filters and is particularly directed to band-pass filters employing transmission lines and capacitors as circuit elements.

At frequencies above 50 megacycles, it becomes increasingly difficult to realize electric wave filters employing lumped constant circuit elements in the conventional manner. Inductors and capacitors no longer behave as simple elements, mutual impedance between filter branches becomes significant, and the leads connecting the elements to form the filter may have reactance values of greater magnitude than the desired element values. Inductor Q values obtainable with the usual coil configurations are not large enough for narrow band-pass application or for wide-band application in which it is necessary to produce a transfer characteristic with steep skirts.

The object of this invention is to provide an improved band-pass filter with low pass-band insertion loss, steep pass-to-rejection skirts, and high rejection-band insertion loss, using simple, compact, and inexpensive construction techniques.

The objects of this invention are attained by the employment of transmission line sections tuned by shunt capacitors at each end to form resonant pi-sections. Two or more resonant pi-sections are capacity coupled in tandem and connected in tandem with the signal circuit transmission line. By proper selection of the line section length and the capacitor values, it is possible to realize a filter over the frequency range of 50 to 500 megacycles with the center frequency adjustable over a range of plus or minus 15% of the design center frequency, and the band-width adjustable over a range of 5 to 35% of center frequency.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
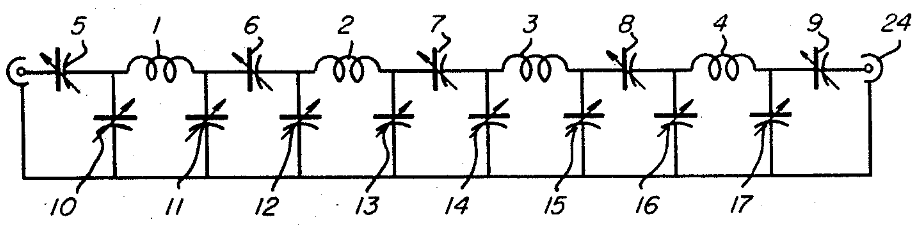
Fig. 1 is a diagram of one circuit embodying this invention.

In Fig. 1 is shown the electrical equivalent of one filter embodying this invention. A plurality of transmission line sections 1, 2, 3 and 4, each of measured length, are coupled in tandem by capacitors 5, 6, 7, 8 and 9. Each line section is tuned at each end by a shunt capacitor 10 to 17 inclusive. The member of sections may be increased or decreased, as desired. One section such as section 2 is tuned at opposite ends by capacitors 12 and 13 to produce a resonate pi-section at the center of the desired pass region.

Figure 2:
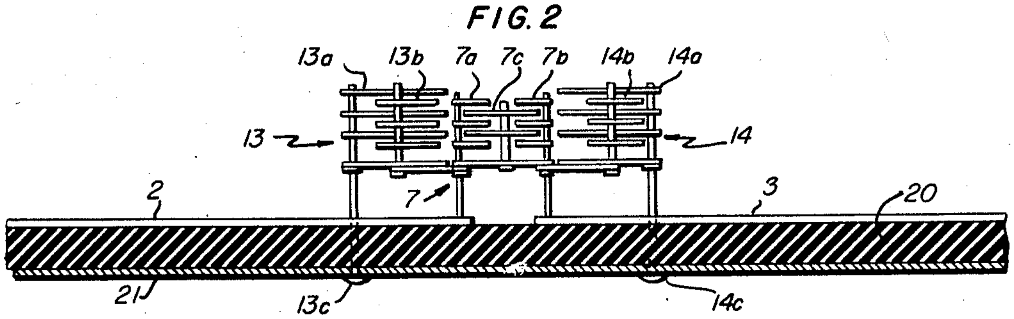
Figs. 2 and 3 are sectional and plan views, respectively, of one physical embodiment of the circuit of Fig. 1.
Figure 3:
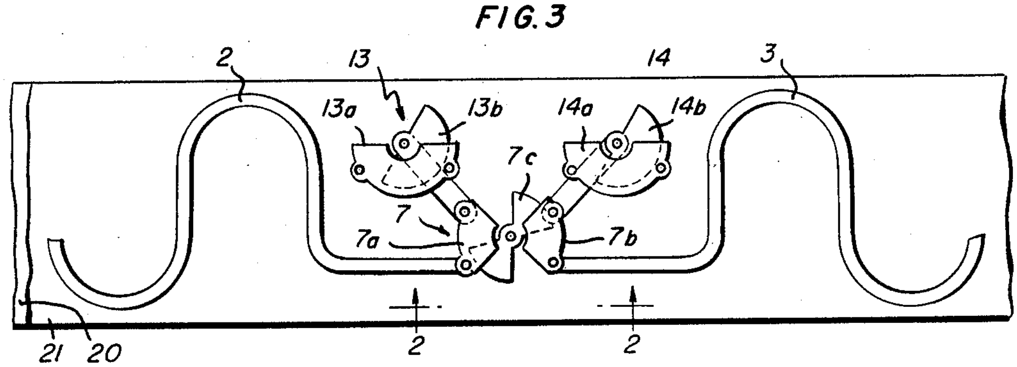

One specific physical embodiment of the filter of this invention is shown in Figs. 2 and 3 wherein the series coupling and shunt tuning capacitors are depicted. The transmission lines may comprise a sheet of insulating material 20 to one side of which is bonded a metal plate 21. The insulating material is chosen for its low high-frequency loss. To the other side of the sheet is applied elongated conductors of measured length to function, with base plate 21, as a transmission line section. The conductors 2 and 3 may be elongated-conductive paths produced, for example, by painting powdered metal on the upper face of the insulator. To conserve overall length, the conductors 1, 2, 3 and 4 may be folded or applied serpentine-fashion across the face of the sheet. The capacitor 7, for capacitively coupling the ends of lines 2 and 3, is shown in Fig. 3 as being of the butterfly type. The stator plates **7*a* and 7*b* are mounted on posts which are staked into the insulating sheet and are electrically connected, respectively, to the adjacent ends of the lines, which are conductors 2 and 3 in the example of Fig. 3. The rotor 7*c*, however, is insulated from ground and is rotatable to vary the capacity between stator plates 7*a* and 7*b*. By such a capacitor arrangement, the line to ground capacitance remains relatively constant for line ends 2 and 3** as the coupling capacity is varied.

The tuning condensers 13 and 14 for adjacent line ends 2 and 3 comprise, respectively, stator plates **13*a* and 14*a* mounted on posts 13*c* and 14*c* which are staked through the insulating sheet 20 and connected to the ground plate 21. The rotors 13*b* and 14*b* are electrically connected to the adjacent line ends 2 and 3**. It is contemplated that the tuning capacitors and the coupling capacitors for each of the other line sections be similarly mechanically arranged.

By appropriate selection of the capacitance values and line section lengths, it has been found possible to realize the filter over a frequency range of 50 to 500 megacycles with band widths of 5% to 35%, as above-mentioned. It has been found that the band-pass insertion loss is adjustable to as little as 3 to 6 decibels with the rejection range insertion loss as great as 45 decibels. Higher-order pass-insertion-loss increases rapidly with the harmonic order.

Line sections for such filters have been made with commercially obtainable printed circuit board material. The "stripline" line sections are formed by an overall copper base plate on one face and a printed copper conductor on the other face, varying in length from 4.2" to 7". The insulation is of the "glass-Teflon" type, although glass or other low loss material could be used. The characteristic impedance of such "stripline" section employed was 90 ohms. The center frequency range and maximum capacity values for various lengths of line sections are:

| Center-Frequency Adjustment Range | $C_{10}$ to $C_{17}$ (Max. Value), $\mu\mu f$. | $C_6$ to $C_8$ (Max. Value), $\mu\mu f$. | Length of $L_1$ to $L_4$, inches |
|---|---|---|---|
| 200 to 250 Megacycles | 20 | 11 | 7.00 |
| 250 to 300 Megacycles | 20 | 11 | 5.7 |
| 300 to 350 Megacycles | 9 | 5 | 4.9 |
| 350 to 400 Megacycles | 9 | 5 | 4.2 |

Figure 4:
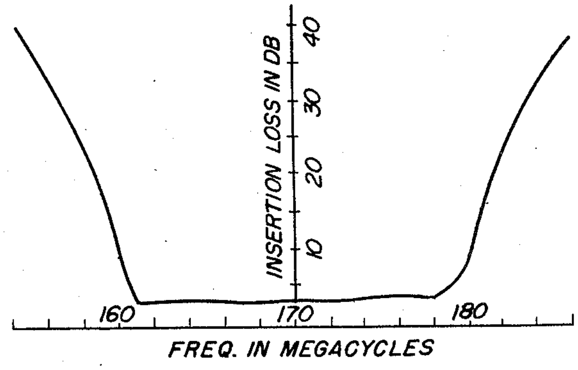
Fig. 4 is a graph of the attenuation characteristics of the filter of Fig. 1.

One typical characteristic of the filter of this invention is shown in Fig. 4 where it is seen that the band-pass insertion-loss is 3 decibels and the rejection range insertion loss greater than 45 decibels. A Chebishev pass characteristic with ripples of less than one (1) decibel is realized in this four-section filter, with a band-width of 17 megacycles at a center frequency of 169.5 megacycles.

While the principles of the invention have been described in connection with specific apparatus, it is to be clearly understood that this description is made only by way of example and not as a limitation to the scope of the invention.

What is claimed is:

1. In combination in a band-pass filter, a transmission line section comprising a sheet of insulating material having low high-frequency loss characteristics, said sheet having a metal plate against one side thereof and a pair of elongated serpentine-type conductors respectively of measured length against the other side of said sheet and having adjacent ends spaced apart, an adjustable coupling condenser spaced from the conductor side of said sheet and having plate elements respectively mounted on upstanding posts secured to said adjacent ends of said conductors, and a pair of tuning condensers spaced from said conductor side of said sheet and each having rotor and stator elements, one of said elements of each of said tuning condensers being mounted on an upstanding post extending through said sheet and electrically connected to said metal plate, the other element of each of said tuning condensers being electrically connected to one of said elements of said coupling condenser.

2. A band pass filter comprising a transmission line section having a sheet of insulating material of low high-frequency loss characteristics, a metal base plate against one side of said sheet, and two elongated serpentine-type conductors of measured length respectively against the other side of said sheet and having adjacent ends spaced apart, a butterfly type condenser spaced from the conductor side of said sheet and having stator plates mounted respectively on upstanding posts, said posts being respectively connected to said adjacent ends of said conductor and with a rotor adjustable between said stator plates, and a pair of tuning condensers spaced from said conductor side of said sheet and respectively connected between said adjacent conductor ends and said base plate.

References Cited in the file of this patent

UNITED STATES PATENTS

| | | |
|---|---|---|
| 2,751,558 | Grieg et al. | June 19, 1956 |
| 2,760,169 | Englemann | Aug. 21, 1956 |